(12) United States Patent
Clifton et al.

(10) Patent No.: US 11,720,858 B2
(45) Date of Patent: **\*Aug. 8, 2023**

(54) SYSTEMS AND METHODS TO FACILITATE USER ENGAGEMENT WITH UNITS OF WORK ASSIGNED WITHIN A COLLABORATION ENVIRONMENT

(71) Applicant: Asana, Inc., San Francisco, CA (US)

(72) Inventors: Anna Marie Clifton, San Francisco, CA (US); Micah Hanan Fenner, San Francisco, CA (US); Abigail Lorean Kelly, San Francisco, CA (US); Cvetomir I. Cankov, Oakland, CA (US); Sean Sun, San Francisco, CA (US); Sarah Lee Shader, San Francisco, CA (US); John Wesley Graham, San Francisco, CA (US); Eric Seth Pelz, San Francisco, CA (US); Lili Jiang Rachowin, San Franncisco, CA (US); Adam Butler, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,701

(22) Filed: Jul. 12, 2022

(65) Prior Publication Data

US 2022/0343283 A1   Oct. 27, 2022

Related U.S. Application Data

(63) Continuation of application No. 16/947,160, filed on Jul. 21, 2020, now Pat. No. 11,449,836.

(51) Int. Cl.
*G06Q 10/06* (2023.01)
*G06Q 10/10* (2023.01)
(Continued)

(52) U.S. Cl.
CPC ......... *G06Q 10/103* (2013.01); *G06F 3/0482* (2013.01); *G06F 16/2379* (2019.01);
(Continued)

(58) Field of Classification Search
None
See application file for complete search history.

(56) References Cited

U.S. PATENT DOCUMENTS

| 5,233,687 | A | 8/1993 | Henderson, Jr. |
| 5,524,077 | A | 6/1996 | Faaland |
| (Continued) | | | |

FOREIGN PATENT DOCUMENTS

| CN | 101305350 A | 11/2008 |
| CN | 101563671 A | 10/2009 |
| (Continued) | | |

OTHER PUBLICATIONS

N. C. Romano, Fang Chen and J. F. Nunamaker, "Collaborative Project Management Software," Proceedings of the 35th Annual Hawaii International Conference on System Sciences, 2002, pp. 233-242, doi: 10.1109/HICSS.2002.993878.

(Continued)

*Primary Examiner* — Stephanie Z Delich
(74) *Attorney, Agent, or Firm* — Esplin & Associates, PC

(57) ABSTRACT

Systems and methods for facilitating user engagement with units of work assigned within a collaboration environment are presented herein. Implementations may: manage environment state information maintaining a collaboration environment, the environment state information the work unit records including values of an approval state parameter; effectuate presentation of a user interface of the collaboration environment, the user interface displaying individual work unit pages for individual units of work that include a set of user interface elements available for selection by the (Continued)

users, individual user interface elements in the set corresponding to different ones of the values of the approval state parameter; obtain user input information conveying user input characterizing the selection of the individual user interface elements; update the work unit records based on the user input information; and/or other perform other operations.

20 Claims, 5 Drawing Sheets

(51) Int. Cl.
    *G06F 16/23*          (2019.01)
    *G06F 3/0482*       (2013.01)
    *G06Q 10/0631*     (2023.01)
    *G06Q 10/105*      (2023.01)

(52) U.S. Cl.
    CPC ............ *G06Q 10/06316* (2013.01); *G06Q 10/063114* (2013.01); *G06Q 10/105* (2013.01)

(56) References Cited

U.S. PATENT DOCUMENTS

| | | |
|---|---|---|
| 5,530,861 A | 6/1996 | Diamant |
| 5,548,506 A | 8/1996 | Srinivasan |
| 5,608,898 A | 3/1997 | Turpin |
| 5,611,076 A | 3/1997 | Durflinger |
| 5,623,404 A | 4/1997 | Collins |
| 5,721,770 A | 2/1998 | Kohler |
| 5,983,277 A | 11/1999 | Heile |
| 6,024,093 A | 2/2000 | Cron |
| 6,256,651 B1 | 7/2001 | Tuli |
| 6,292,830 B1 | 9/2001 | Taylor |
| 6,332,147 B1 | 12/2001 | Moran |
| 6,385,639 B1 | 5/2002 | Togawa |
| 6,578,004 B1 | 6/2003 | Cimral |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 7,020,697 B1 | 3/2006 | Goodman |
| 7,039,596 B1 | 5/2006 | Lu |
| 7,086,062 B1 | 8/2006 | Faour |
| 7,349,920 B1 | 3/2008 | Feinberg |
| 7,418,482 B1 | 8/2008 | Lusher |
| 7,428,723 B2 | 9/2008 | Greene |
| 7,640,511 B1 | 12/2009 | Keel |
| 7,676,542 B2 | 3/2010 | Moser |
| 7,779,039 B2 | 8/2010 | Weissman |
| 7,805,327 B1 | 9/2010 | Schulz |
| RE41,848 E | 10/2010 | Daniell |
| 7,917,855 B1 | 3/2011 | Satish |
| 7,991,632 B1 | 8/2011 | Morris |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,586,211 B2 | 3/2020 | Steplyk |
| 10,594,788 B2 | 3/2020 | Larabie-Belanger |
| 10,606,859 B2 | 3/2020 | Smith |
| 10,613,735 B1 | 4/2020 | Karpe |
| 10,616,151 B1 | 4/2020 | Cameron |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Rosenstein |
| 11,095,468 B1 | 8/2021 | Pandey |
| 11,113,667 B1 | 9/2021 | Jiang |
| 11,138,021 B1 | 10/2021 | Rosenstein |
| 11,140,174 B2 | 10/2021 | Patel |
| 11,204,683 B1 | 12/2021 | Sabo |
| 11,212,242 B2 | 12/2021 | Cameron |
| 11,263,228 B2 | 3/2022 | Koch |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Cheng |
| 2002/0065798 A1 | 5/2002 | Bostleman |
| 2002/0082889 A1 | 6/2002 | Oliver |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |

(56) References Cited

U.S. PATENT DOCUMENTS

| | | |
|---|---|---|
| 2004/0093351 A1 | 5/2004 | Lee |
| 2004/0098291 A1 | 5/2004 | Newburn |
| 2004/0122693 A1 | 6/2004 | Hatscher |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0027582 A1 | 2/2005 | Chereau |
| 2005/0210394 A1 | 9/2005 | Crandall |
| 2005/0216111 A1 | 9/2005 | Ooshima |
| 2005/0222971 A1 | 10/2005 | Cary |
| 2006/0028917 A1 | 2/2006 | Wigginton |
| 2006/0047454 A1 | 3/2006 | Tamaki |
| 2006/0085245 A1 | 4/2006 | Takatsuka |
| 2006/0095859 A1 | 5/2006 | Booking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen, III |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2008/0313110 A1 | 12/2008 | Kreamer |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199113 A1 | 8/2009 | McWhinnie |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0235182 A1 | 9/2009 | Kagawa |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0306007 A1 | 12/2010 | Ganapathyraj |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0080919 A1 | 3/2013 | Kiang |
| 2013/0103412 A1 | 4/2013 | Nudd |
| 2013/0124254 A1 | 5/2013 | Jafri |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |

(56) References Cited

U.S. PATENT DOCUMENTS

| | | |
|---|---|---|
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0012616 A1 | 1/2014 | Moshenek |
| 2014/0025767 A1 | 1/2014 | De Kezel |
| 2014/0036639 A1 | 2/2014 | Taber |
| 2014/0040780 A1 | 2/2014 | Artzt |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0153906 A1 | 6/2015 | Liao |
| 2015/0213411 A1 | 7/2015 | Swanson |
| 2015/0215256 A1 | 7/2015 | Ghafourifar |
| 2015/0262111 A1 | 9/2015 | Yu |
| 2015/0312375 A1 | 10/2015 | Valey |
| 2015/0317595 A1 | 11/2015 | De |
| 2015/0339006 A1 | 11/2015 | Chaland |
| 2015/0363092 A1 | 12/2015 | Morton |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Vida |
| 2016/0216854 A1 | 7/2016 | McClellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0307210 A1 | 10/2016 | Agarwal |
| 2016/0313934 A1 | 10/2016 | Isherwood |
| 2016/0328217 A1 | 11/2016 | Hagerty |
| 2016/0342927 A1 | 11/2016 | Reznik |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0147960 A1 | 5/2017 | Jahagirdar |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0206501 A1 | 7/2017 | Wang |
| 2017/0249577 A1 | 8/2017 | Nishikawa |
| 2017/0316358 A1 | 11/2017 | Candito |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0337517 A1 | 11/2017 | Defusco |
| 2017/0344754 A1 | 11/2017 | Kumar |
| 2017/0346861 A1 | 11/2017 | Pearl |
| 2017/0351385 A1 | 12/2017 | Ertmann |
| 2017/0364214 A1 | 12/2017 | Javed |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0082255 A1 | 3/2018 | Rosati |
| 2018/0088754 A1 | 3/2018 | Psenka |
| 2018/0089625 A1 | 3/2018 | Rosati |
| 2018/0095938 A1 | 4/2018 | Monte |
| 2018/0102989 A1 | 4/2018 | Borsutsky |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189735 A1 | 7/2018 | Lo |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285471 A1 | 10/2018 | Hao |
| 2018/0300305 A1 | 10/2018 | Lam |
| 2018/0316636 A1 | 11/2018 | Kamat |
| 2018/0331842 A1 | 11/2018 | Faulkner |
| 2018/0357049 A1 | 12/2018 | Epstein |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |

(56) References Cited

U.S. PATENT DOCUMENTS

| | | |
|---|---|---|
| 2019/0080289 A1 | 3/2019 | Kreitler |
| 2019/0089581 A1 | 3/2019 | Purandare |
| 2019/0095839 A1 | 3/2019 | Itabayashi |
| 2019/0095846 A1 | 3/2019 | Gupta |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0213509 A1 | 7/2019 | Burleson |
| 2019/0265821 A1 | 8/2019 | Pearl |
| 2019/0340296 A1 | 11/2019 | Cunico |
| 2019/0340554 A1 | 11/2019 | Dotan-Cohen |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0019907 A1 | 1/2020 | Notani |
| 2020/0059539 A1 | 2/2020 | Wang |
| 2020/0065736 A1 | 2/2020 | Relangi |
| 2020/0145239 A1 | 5/2020 | Ghods |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0035069 A1 | 2/2021 | Parikh |
| 2021/0049555 A1 | 2/2021 | Shor |
| 2021/0073697 A1 | 3/2021 | Paranjape |
| 2021/0097466 A1 | 4/2021 | Sabo |
| 2021/0097490 A1 | 4/2021 | Ratcliff |
| 2021/0103451 A1 | 4/2021 | Sabo |
| 2021/0110347 A1 | 4/2021 | Khalil |
| 2021/0136012 A1 | 5/2021 | Barbitta |
| 2021/0149925 A1 | 5/2021 | Mann |
| 2021/0182475 A1 | 6/2021 | Pelz |
| 2021/0216562 A1 | 7/2021 | Smith |
| 2021/0232282 A1 | 7/2021 | Karpe |
| 2021/0320891 A1 | 10/2021 | Rosenstein |
| 2021/0342361 A1 | 11/2021 | Radzewsky |
| 2021/0342786 A1 | 11/2021 | Jiang |
| 2021/0382734 A1 | 12/2021 | Rosenstein |
| 2022/0019320 A1 | 1/2022 | Sabo |
| 2022/0019959 A1 | 1/2022 | Roy |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |
| 2022/0215315 A1 | 7/2022 | Sabo |

FOREIGN PATENT DOCUMENTS

| | | |
|---|---|---|
| CN | 102378975 B | 5/2015 |
| JP | 2008059035 A | 3/2008 |
| WO | 2015036817 A1 | 3/2015 |
| WO | 2015123751 A1 | 8/2015 |
| WO | 2016115621 A1 | 7/2016 |
| WO | 2020006634 A1 | 1/2020 |

OTHER PUBLICATIONS

"U.S. Appl. No. 14/584,750, Examiner Interview Summary dated Feb. 25, 2016", 3 pgs.
"U.S. Appl. No. 14/584,750, Non Final Office Action dated Aug. 28, 2015", 21 pgs.
"U.S. Appl. No. 14/584,750, Notice of Allowance dated Mar. 28, 2016", 8 pgs.
"U.S. Appl. No. 14/584,750, Response filed Feb. 29, 2015 to Non Final Office Action dated Aug. 28, 2015", 16 pgs.
"U.S. Appl. No. 14/584,850, Final Office Action dated Sep. 1, 2017", 31 pgs.
"U.S. Appl. No. 14/584,850, Non Final Office Action dated Jan. 10, 2017", 9 pgs.
"U.S. Appl. No. 14/584,850, Response filed Apr. 10, 2017 to Non Final Office Action dated Jan. 10, 2017", 13 pgs.
"How to Asana: Inviting teammates to Asana." YouTube, Asana, Mar. 21, 2017, https://www.youtube.com/watch?v=TLOruY1KyxU (Year: 2017), 13 pages.
"Rules of Data Conversion from Document to Relational Databases", published: 2014, publisher: Future-processing, pp. 1-8 (Year: 2014).
(Tiburca, Andrew) Best Team Calendar Applications for 2018— Toggl https://toggl.com/blog/best-team-calendar-applications-for-2018 (Year: 2017).
Asana Demo and Product Tour, you tube excerpt, Dec. 7, 2017 https://www.youtube.com/watch?v=IMAFWVLGFyw (Year: 2017) (16 pages).
Asana integrations, Asana tutorial, youtube, excerpt, Nov. 16, 2016 https://www.youtube.com/watch?v=hBiQ7DJNinE (Year: 2016) (21 pages).
Asana Workload and Portfolios,youtube,excerpt, Aug. 1, 2019 https://www.youtube.com/watch?v=7XkNcfFDG6M (Year: 2019) (20 pages).
Asana YouTube channel, list of all product videos, Nov 19, 2014-Aug. 19, 2019 https://www.youtube.com/user/AsanaTeam/videos?disable_polymer=1 (Year: 2019) (5 pages).
Asana, Task dependencies, archives org, Aug. 25, 2017 https://web.archive.org/web/20170825002141/https://asana.com/guide/help/tasks/dependencies (Year: 2017) (5 pages).
Asana, Manage your team capacity with Workload, youtube, excerpt, Aug. 1, 2019 https://www.youtube.com/watch?v=2ufXyZDzZnA &list=PLJFG93oi0wJAi UwyOhlGWHdtJzJrzylBv (Year: 2019) (1 page).
Assef, F., Cassius, T. S., & Maria, T. S. (2018). Confrontation between techniques of time measurement. Journal of Manufacturing Technology Management, 29(5), 789-810. (Year: 2018).
Biggs, "GateGuru Relaunches With New Ways to Streamline Your Travel Experience", Techcrunch, (Apr. 26, 2013), 3 pgs.
Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).
Command and control, Wikipedia, archives org, Mar. 16, 2018 https://web.archive.org/web/20180316193655/https://en.wikipedia.org/wiki/Command_and_control (Year: 2018), 6 pages.
Creating Tables with Fields from 2 Different Tables, published: 2009, publisher: StackOverflow, pp. 1-2. (Year: 2009).
Critical chain project management, Wikipedia, archives org, Dec. 17, 2016 https://web.archive.Org/web/20161217090326/https://en.wikipedia.org/wiki/Critical_chain_project_management (Year: 2016) 5 pages.
Critical Path Method, Wikipedia, archives org, Sep. 19, 2017 https://web.archive.Org/web/20170919223814/https://en.wikipedia.org/wiki/Critical_path_method (Year: 2017) 6 pages.
Dawei Li, "Deepcham: Collaborative Edge-Mediated Adaptive Deep Learning for Mobile Object Recognition", 2016, IEEE/ACM, pp. 64-76 (Year: 2016).
Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.
Hartmann, "TimeProjectscheduling with resource capacities and requests varying with time: a case study," 2013, Flexible services and manufacturing journal, vol. 25, No. 1, pp. 74-93 (Year: 2013).
Helen Mongan-Rallis & Terrie Shannon, "Synchronous Chat," Aug. 2016, Dept. of Education, Univ. of MN Duluth, web. archive.org/web/20160825183503/https://www.d.umn.edu/hrallis/professional/presentations/cotfsp06/indiv_tools/sync_chat.htm (Year: 2016) (2 pages).

(56) References Cited

OTHER PUBLICATIONS

How to Asana Asana time tracking, youtube, excerpt, May 24, 2017 https://www.youtube.com/watch?v=29lqlex-TLc (Year: 2017) (1 page).

How to Asana, Asana project management, youtube, excerpt, Mar. 7, 2017 https://www.youtube.com/watch?v=qqANMTvVpE (Year: 2017) (28 pages).

How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLrNMdv3o (Year: 2017) (24 pages).

How to Asana, Planning with Asana calendar, youtube excerpt, Feb. 14, 2017 https://www.youtube.com/watch?v=w8t6KYiVPyc (Year: 2017) (19 pages).

How to Asana, Using Asana for task management, youtube, excerpt, Feb. 7, 2017 https://www.youtube.com/watch?v=vwvbgiejhQ (Year: 2017) (8 pages).

How to Asana, Visualizing work with Asana kanban boards, youtube, excerpt, Feb. 21, 2017 https://www.youtube.com/watch?v=jmZaZGydfPY (Year: 2017) (41 pages).

How to Asana, Workflow management, youtube, excerpt, May 30, 2017 https://www.youtube.com/watch?v=rk8nPWmXsRo (Year: 2017) (9 pages).

How to use Advanced Search in Asana, Asana tutorial, May 25, 2016 https://www.youtube.com/watch?v=5VyJ3toPfQM (Year: 2016) (28 pages).

Justin Rosenstein, Unveiling the Future of Asana, Mar. 28, 2018 https://www.youtube.com/watch?v=nRI?d_WM4Bc (Year: 2018) (2 pages).

Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

Macro, computer science, Wikipedia, archives org, 6 pages, Feb. 11, 2020 http://web.archive.org/web/20200211082902/https://en.wikipedia.org/wiki/Macro_(computer_science) (Year: 2020).

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).

Paul Minors, How to automate your tasks, youtube excerpts, Oct. 18, 2019 https://www.youtube.com/watch?v=lwF9XyUQrzw (Year: 2019).

Prioritize My Tasks in Asana, Asana tutorial, youtube, excerpt, May 25, 2016 https://www.youtube.com/watch?v=UbCnMvw01nl (Year: 2016) (3 pages).

Project views, Asana tutorial, youtube, excerpt May 25, 2016 https://www.youtube.com/watch?v=FYjA8ZH3ceQ (Year: 2016) (5 pages).

Using Asana Premium, Asana tutorial, youtube, excerpt, Sep. 10, 2016 https://www.youtube.com/watch?v=vMgLtDDmyeo (Year: 2016) (4 pages).

Where does Asana fit in, archives org, Jul. 8, 2017 https://web.archive.org/web/20170708150928/https://asana.com/guide/resources/infosheets/where-does-asana-fit (Year: 2017) (5 pages).

Wix.com, How to Use Wix Code with Marketing Tools to Create Custom Events, Oct. 18, 2018, YouTube, https://www.youtube.com/watch?v=MTBVykOYGvO&feature=emb_title, 2 pages.

www.asana.com (as retrieved from https://web.archive.Org/web/20160101054536/https://asana.com/press and https://web.archive.org/web/20160101054527/https://asana.com/product) (Year: 2016) 15 pages.

www.cogmotive.com/blog/author/alan Alan Byrne: "Creating a company Shared Calendar in Office 365"; pp. 1-17; Sep. 10, 2013 (16 pages).

Klipfoliio. "What is a Project Management Dashboard?". Jan. 18, 2021. <https://web.archive.org/web/20210128061955/https:// www.klipfolio.com/resources/articles/project-management-dashboard> (Year: 2021) 6 pages.

Shivakumar; Complete Guide to Digital Project Management; 2018; Apress; (https://doi.org/10.1007/978-1-4842-3417-4; last access Mar. 6, 2023).

SYSTEMS AND METHODS TO FACILITATE USER ENGAGEMENT WITH UNITS OF WORK ASSIGNED WITHIN A COLLABORATION ENVIRONMENT

FIELD OF THE DISCLOSURE

The present disclosure relates to systems and methods to facilitate user engagement with units of work assigned within a collaboration environment.

BACKGROUND

Collaboration environments, sometimes referred to as integrated collaboration environments, may enable users to assign projects, tasks, or other assignments to assignees (e.g., other users) to complete. A collaboration environment may comprise an environment in which a virtual team of users does its work. A collaboration environment may enable users to work in a more organized and efficient manner. A collaboration environment may integrate features and/or functionality such as web-based conferencing and collaboration, desktop videoconferencing, and/or instant message into a single easy-to-use, intuitive interface.

SUMMARY

One aspect of the present disclosure relates to a system configured to facilitate user engagement with units of work assigned within a collaboration environment. Upon completion of a unit of work, a status of the unit of work may be set as "complete" by a user. However, satisfaction of the completion of the unit of work may not be characterized with merely setting the status of the unit of work as "complete" or "incomplete". In some implementations, the user may specify an approval state of the unit of work by marking the unit of work as one or more of approved, revise, rejected, pending approval, and/or other states. In some implementations, "revise" may be accompanied by and/or may refer to a request to make changes, e.g., "changes requested," "request changes," and/or other instructions. In some implementations, upon the unit of work being marked as approved, the status of the unit of work may be set as "complete". In some implementations, upon the unit of work being marked with revise, one or more new units of work may be generated. The one or more new units of work may be based on necessary revisions as indicated by the user. The one or more new units of work may be assigned to an assignor of the unit of work to address the revisions. In some implementations, upon the unit of work being marked as rejected, the status of a preexisting unit of work may be reset from "complete" to "incomplete". These and/or other approval states may promote clarity and/or organization within review cycles as well as progress recordation for users and/or units of work.

One or more implementations of a system to facilitate user engagement with units of work assigned within a collaboration environment may include one or more hardware processors configured by machine-readable instructions. Executing the machine-readable instructions may cause the one or more hardware processors to facilitate user engagement with units of work. The machine-readable instructions may include computer program components. The computer program components may include one or more of an environment state component, a user interface component, a work unit component, and/or other components.

The environment state component may be configured to manage environment state information maintaining a collaboration environment and/or other information. The collaboration environment may be configured to facilitate interaction by users with the collaboration environment. The environment state information may include work unit records describing units of work assigned to the users within the collaboration environment. The work unit records may include values of an approval state parameter and/or other values of other parameters. The approval state parameter may characterize approval of the units of work by the users assigned to the units of work. The values of the approval state parameter may include one or more of an approve value, a revise value, a reject value, a pending approval value, and/or other values. By way of non-limiting illustration, the work unit records may include a first work unit record for a first unit of work and/or other work unit records.

The user interface component may be configured to effectuate presentation of a user interface of the collaboration environment. The user interface may display individual work unit pages for individual units of work. Individual work unit pages may include a set of user interface elements available for selection by the users. Individual user interface elements in the set may correspond to different ones of the values of the approval state parameter.

The work unit component may be configured to obtain user input information conveying user input characterizing the selection of the individual user interface elements in the individual work unit pages. The selection of an individual user interface element in an individual work unit page of an individual unit of work may cause a corresponding value of the approval state parameter to be specified for the individual unit of work.

The work unit component may be configured to update the work unit records based on the user input information and/or other information. In some implementations, responsive to obtaining first user input characterizing the selection of a first user interface element on a first work unit page of the first unit of work, the work unit component may be configured to update the first work unit record by specifying the approve value for the approval state parameter of the first unit of work.

In some implementations, responsive to obtaining second user input characterizing the selection of a second user interface element on the first work unit page of the first unit of work, the work unit component may be configured to update the first work unit record by specifying the revise value for the approval state parameter of the first unit of work.

In some implementations, responsive to obtaining third user input characterizing the selection of a third user interface element on the first work unit page of the first unit of work, the work unit component may be configured to update the first work unit record by specifying the reject value for the approval state parameter of the first unit of work.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "manage" (and derivatives thereof) may include active and/or passive direction, recommendation, suggestion, approval, rejection to users within a collaboration environment and/or any combination thereof. As used herein, the term "effectuate" (and derivatives thereof) may include active and/or passive causation of any effect. As used herein, the term "obtain" (and derivatives thereof) may include active and/or passive retrieval, determination, derivation, transfer, upload, download, submission, and/or exchange of information, and/or any combination thereof. As used herein, the term "update" (and derivatives thereof) may include adding, removing, changing units of work value to an individual work unit page and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
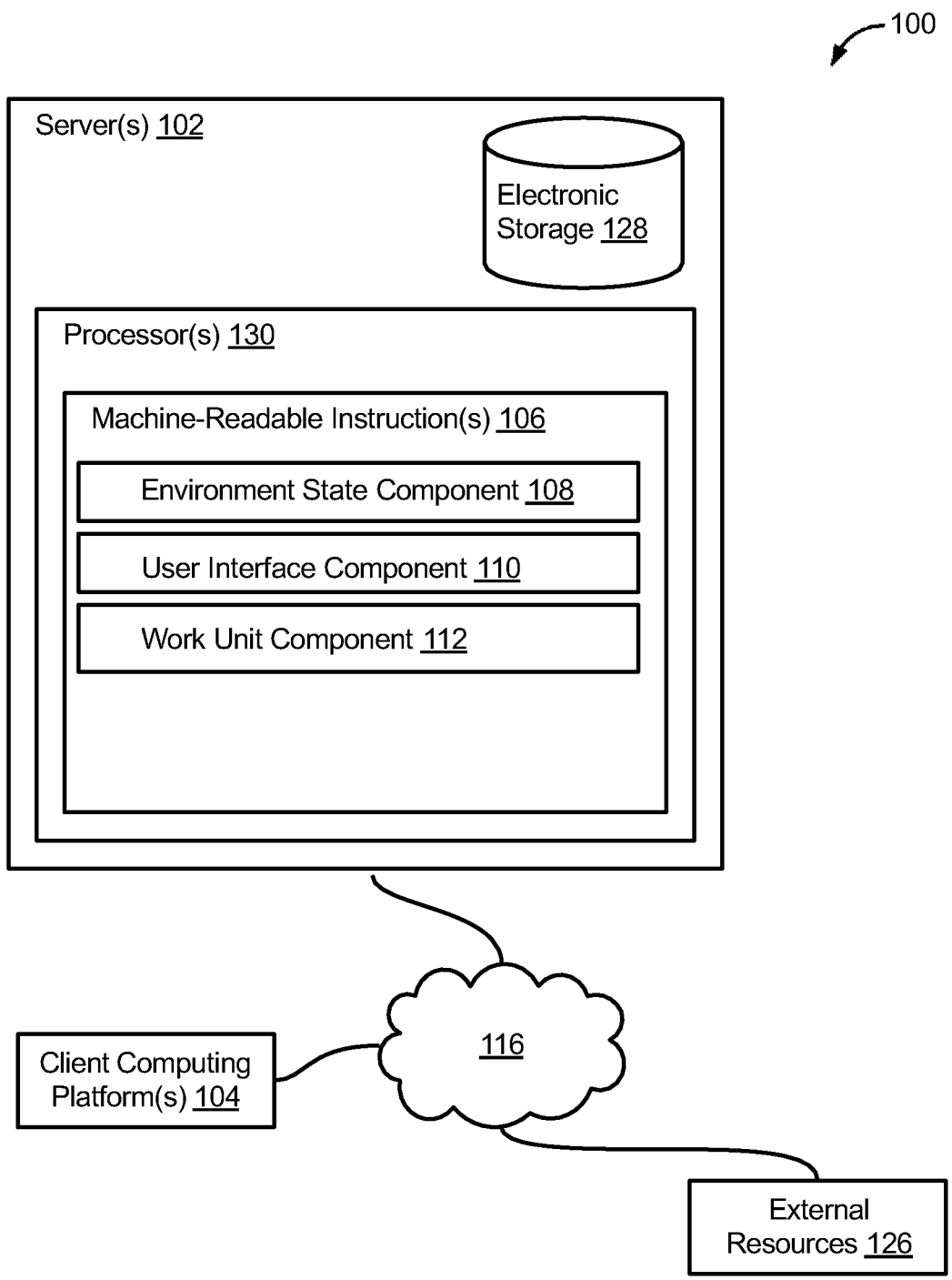
FIG. 1 illustrates a system configured to facilitate user engagement with units of work assigned within a collaboration environment, in accordance with one or more implementations.

FIG. 1 illustrates a system 100 configured to facilitate user engagement with units of work within a collaboration environment, in accordance with one or more implementations. In some implementations, the user may specify an approval state of a unit of work by marking the unit of work as one or more of approved, revise, rejected, pending approval, and/or other states. Upon the unit of work being specified as approved, a status of the unit of work may be set as "complete". Upon the unit of work being specified as revise, one or more new units of work may be generated. The one or more new units of work may be based on necessary revisions as indicated by the user. The one or more new units of work may be assigned to an assignor of the unit of work to address the revisions. Upon the unit of work being specified as rejected, the status of a preexisting unit of work may be reset from "complete" to "incomplete". The unit of work may be subordinate to the preexisting unit of work. These and/or other approval states may promote clarity and/or organization within review cycles as well as progress recordation for users and/or units of work.

In some implementations, system 100 may include one or more of one or more servers 102, one or more client computing platforms 104, external resources 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include one or more of non-transitory electronic storage 128, one or more processors 130 configured by machine-readable instructions 106, and/or other components. Machine-readable instructions 106 may include one or more instruction components. The instruction components may include computer program components. Executing the machine-readable instructions 106 may cause server(s) 102 to facilitate user engagement with units of work within a collaboration environment. The computer program components may include one or more of an environment state component 108, a user interface component 110, a work unit component 112, and/or other instruction components.

Environment state component 108 may be configured to manage environment state information and/or other information used in maintaining a collaboration environment. The collaboration environment may be configured to facilitate interaction by users within the collaboration environment. The environment state information may include one or more of user information, work information, and/or other information used to define, support, and/or otherwise maintain a collaboration environment.

The user information may include values of user parameters. The values of the user parameters may be organized in user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group parameter, a user account, a user role information, a user department, descriptive user content, a to-email, a from-email, a photo, an organization, a workspace, one or more projects (which may include project parameters defined by one or more work unit records), one or more items of work (which may include one or more unit of work parameters defined by one or more unit of work records), one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), a presence parameter (e.g., indicating presence and/or interaction level at an environment level, unit of work level, project level, task level, application level, etc.), one or more notification settings, one or more progress parameters, status information for one or more work units the user is associated with (units of work assigned to the user, assigned to other users by the user, completed by the user, past-due date, and/or other information), one or more performance metrics of a given user (e.g., how many units of work the user has completed, how quickly the user completed the units of work, how quickly the user completes certain types of work units, the efficiency of the user, bandwidth of the user, activity level of the user, etc.), application access information (e.g., username/password for one or more third-party applications), one or more favorites and/or priorities, schedule information, role information, and/or other information.

User role information may specify individual roles of the individual users in the individual units of work. A role may represent a position of an individual user. The position may be specified based on a description of one or more of job title, level, stage, and/or other descriptions of position. The role may be specified with respect to a company as a whole, a particular unit of work, a set of units of work, and/or other considerations. By way of non-limiting illustration, a role may include one or more of chief executive officer (or other officer), owner, manager, supervisor, accountant, associate, employee, entry level, midlevel, senior, administrator, director, foreman, engineer, product developer, human resource officer, artist, art director, and/or other description.

The work information may include values of one or more work unit parameters. The values of the work unit parameters may be organized in work unit records corresponding to units of work (also referred to as work units) managed, created, and/or assigned within the collaboration environment. A given work unit may have one or more assignees and/or team members working on the given work unit. Work units may include one or more to-do items, action items, objectives, and/or other units of work one or more users should accomplish and/or plan on accomplishing. Units of work may be created by a given user for the given user and/or created by the given user and assigned to one or more other users. Individual units of work may include one or more of an individual project, an individual task, an individual sub-task, and/or other units of work assigned to and/or associated with one or more users. Individual units of work may include one or more digital content items. An individual unit of work may include an individual digital content item by virtue of the individual digital content item (and/or a copy or instance thereof) being attached and/or appended thereto. An individual unit of work may include an individual digital content item by virtue of the individual digital content item (and/or a copy or instance thereof) being accessible via the individual unit of work (e.g., via link, URL, a pointer, and/or other techniques to provide access). A digital content item may include one or more of an image, a video, an audio file, a PDF, a word document, and/or other digital content items.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access by one or more users unless and/or until a subordinate work unit record is completed and/or started.

Individual work unit records may include values of an approval state parameter and/or other parameters. The approval state parameter may characterize approval of the units of work by the users assigned to the units of work. The values of the approval state parameter may include one or more of an approve value, a revise value, a reject value, a pending approval value, and/or other approval state values. In some implementations, the work unit records may include a first work unit record describing a first unit of work assigned to a first user and/or other work unit records. The first unit of work may include a first digital content item and/or other information.

Individual work units records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, as a consequence of the record hierarchies, the individual units of work described in the individual work unit records that are subordinate to the other individual work unit records may be subordinate to the individual units of work in the other individual work unit records.

In some implementations, the one or more work unit parameters may include one or more of a work assignment parameter, a work management parameter, work creation parameter, and/or other parameters. The values of the work assignment parameter may describe units of work assigned to the individual users. The values of the work management parameter may describe units of work managed by the individual users. The values of the work creation parameter may describe units of work created by the individual users.

In some implementations, the units of work may be described based on one or more of a unit of work name, a unit of work description, one or more unit of work dates (e.g., a start date, a due date, a completion date, and/or dates), one or more members associated with a unit of work (e.g., an owner, one or more other project/task members, member access information, and/or other unit of work members and/or member information), a status parameter (e.g., an update, a hardcoded status update, a completed/incomplete/mark complete, a measured status, a progress indication, quantity of sub-work units remaining for a given unit of work, completed work units in a given project, and/or other status parameter), one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, given work unit of work was viewed, a given unit of work was selected, how long the given unit of work has been idle, a last interaction parameter indicating when and what user last interacted with the given unit of work, users that interacted with the given unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc.), state of a workspace for a given unit of work (e.g., application state parameters, application status, application interactions, user information, and/or other parameters related to the state of the workspace for a unit of work), hierarchical information, one or more custom fields (e.g., priority, cost, stage, and/or other custom fields), and/or other information.

The values of the work assignment parameter describing units of work assigned to the individual users may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work assignment parameter may indicate that a status parameter of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

User interface component 110 may be configured to effectuate presentation of a user interface of the collaboration environment. In some implementations, user interface component 110 may be configured to effectuate presentation of individual user interfaces on individual client computing platforms of one or more client computing platforms 104. The user interface component 110 may be configured to effectuate presentation of a user interface displaying the units of work. In some implementations, the user interface may display representations of the units of work in a timeline based on individual start dates and individual end dates of the individual units of work. In some implementations, the user interface may display representations of the units of work in an ordered list based on individual start dates of the individual units of work. In some implementations, representations of the units of work may include icons, graphics, and/or other elements. Selection of a representation of the units of work may facilitate generating views displaying the units of work.

The user interface may display individual work unit pages for individual units of work. The individual work unit pages may include a set of user interface elements available for selection by the users. The individual user interface elements in the set may correspond to different ones of the values of the approval state parameter.

The user interface elements may be configured to facilitate user interaction with the user interface, user entry, and/or selection. By way of non-limiting illustration, the user interface elements may include one or more of text input fields, drop down menus, check boxes, display windows, virtual buttons, and/or other user interface elements.

In some implementations, the user interface elements may include one or more visual representations. The visual representations may include icons, graphics, colors, text, and/or other elements. By way of non-limiting example, the user interface element corresponding to the approve value may be an outlined box and with a check mark icon and/or other graphics. The user interface element corresponding to the revise value may be an outlined box with an arrow icon and/or other graphics. The user interface element corresponding to the reject value may be a outlined box with an "X" icon and/or other icons. The individual user interface elements may be colored. By way of non-limiting illustration, the user interface element corresponding to the approve value may be green; the user interface element corresponding to the revise value may be yellow; and/or the user interface element corresponding to the reject value may be red.

In some implementations, the visual representations for the individual user interface elements that correspond to the different ones of the values of the approval state parameters may be set and/or modified by an administrative user and/or other users. In some implementations, the visual representations for the individual user interface elements that correspond to the different ones of the values of the approval state parameters may be fixed and unmodifiable.

Work unit component 112 may be configured to obtain user input information and/or other information. The user input information may convey user input characterizing the selection of the individual user interface elements in the individual work unit pages. The selection of an individual user interface element in an individual work unit page of an individual unit of work may cause a corresponding value of the approval state parameter to be specified for the individual unit of work.

In some implementations, the user input may further comprise user entry of input content and/or other information in the individual units of work. The input content may include, for example, the text of the comment input by a user. By way of non-limiting example, user input by the first user on, or relating to, the first digital content item may include first input content.

The work unit component 112 may be configured to update the work unit records based on the user input information and/or other information. In particular, work unit component 112 may be configured to update the work unit records based on the selection of the individual user interface elements in an individual work unit page of the individual unit of work.

In some implementations, a first work unit page of the first unit of work may include one or more of a first user interface element, a second user interface element, a third user interface element, and/or other user interface elements. The first user interface element may correspond to the approve value; the second user interface element may correspond to the revise value; and/or the third user interface element may correspond to the reject value.

In some implementations, work unit component 112 may be configured to update the first work unit record by specifying the approve value for the approval state parameter of the first unit of work. Such update may be responsive to obtaining first user input characterizing the selection of the first user interface element on the first work unit page of the first unit of work. In some implementations, updating the first work unit record to specify the approve value for the approval state parameter may cause a value of a status parameter of the first work unit record to be specified with a value of complete.

In some implementations, specifying the approve value for the approval state parameter of a unit of work may cause one or more automated actions to be carried out. Specifying the approve value for the approval state parameter of a unit of work may act as a trigger event to carry out one or more automated actions. In some implementations, an individual automated action may include effectuating one or more of creation of, change in, and/or specification of, one or more values of one or more of the parameters. In some implementations, the creation of, change in, and/or specification of values of parameters may be accomplished by accessing a corresponding record (e.g., user record, work unit record, and/or other records). In some implementations, creation of, change in, and/or specification of an individual value may be reflected in views of the collaboration environment accessed by users. In some implementations, an individual automated action may include effectuating an action outside of the collaboration environment (e.g., in an external resource).

In some implementations, individual sets of automated actions and associated individual trigger events may be stored in individual automation records. An automation record may define one or more of individual actions, individual trigger events, and/or other information. Individual actions may be defined by a target component, an action component, and/or other information. The target component of an automation record may include a parameter (or parameters) to which an action is to be carried out on. The action component of an automation record may define what change is to be made on the parameter (or parameters) defined by the target component. Individual trigger events may be defined by a source component, an event component, and/or other information. The source component of an automation record may include the approval state parameter of a unit of work. The event component may include the approval state parameter being defined by the approval state. Automation records may be specified by individual users. Automation records may reflect common repeated steps a user may take responsive to an approval of a unit of work. This automation may improve user efficiency and workflow since manual intervention may not be required following the approval of a unit of work.

In some implementations, user interface component 110 may be configured to update the user interface based on the update of the work unit records and/or other information. In some implementations, user interface component 110 may be configured to update the first work unit page to include indicia showing that the first unit of work has been approved. Such update may be responsive to the first work unit record specifying with the approve value for the approval state parameter of the first unit of work. Indicia showing that values of the approval state of individual units of work may include one or more of the visual representations. For example, the indicia showing that the first unit of work has been approved may include the first user interface element that corresponds to the approve value having a visual change in its appearance, e.g., change to a solid color. For example, the indicia showing that the first unit of work has been approved may include a green check icon and/or text specifying the user who approval the unit of work.

In some implementations, the work unit component 112 may be configured to update the first work unit record by specifying the revise value for the approval state parameter of the first unit of work. Such update may be responsive to obtaining second user input characterizing the selection of the second user interface element on the first work unit page of the first unit of work. In some implementations, user interface component 110 may be configured to update the first work unit page to include indicia showing that the first unit of work has been revised. Such update may be responsive to the first work unit record specifying the revise value for the approval state parameter of the first unit of work. For example, the indicia showing that the first unit of work has been revised may include the second user interface element that corresponds to the revise value having a visual change. For example, the indicia showing that the first unit of work has been revised may include a yellow arrow icon and/or text specifying the user who revised the unit of work.

In some implementations, the work unit component 112 may be configured to update the first work unit record by specifying the reject value for the approval state parameter of the first unit of work. Such update may be responsive to obtaining third user input characterizing the selection of the third user interface element on the first work unit page of the first unit of work. In some implementations, user interface component 110 may be configured to update the first work unit page to include indicia showing that the first unit of work has been rejected. Such update may be responsive to the first work unit record specifying the reject value for the approval state parameter of the first unit of work. For example, the indicia showing that the first unit of work has been rejected may include the second user interface element that corresponds to the revise value to have a visual change. For example, the indicia showing that the first unit of work has been reject may include a red arrow icon and/or text specifying the user who rejected the unit of work.

In some implementations, work unit component 112 may be configured to generate one or more work unit records based on the user input information and/or other information. Further, work unit component 112 may be configured to automatically assign individual ones of the individual units of work included in the one or more work unit records generated based on the user input information to individual users who are assignors of the individual units of work which are under approval.

In some implementations, updating the first work unit record to specify the revise value for the approval state parameter for the first unit of work may cause a second work unit record for a second unit of work to be generated. Work unit component 112 may be configured to generate the second work unit record for the second unit of work. In some implementations, the second work unit record may be subordinate to the first work unit record within a record hierarchy. In some implementations, the second work unit record may be at the position in the record hierarchy as the first work unit record. The second unit of work may describe revisions to be completed with respect to the first unit of work. The revisions may be input by the assignee of the first unit of work. The revisions may be input prior to or subsequently to the selection of the second user input element (corresponding to the revise value) on the first work unit page of the first unit of work. The revisions may be included in the unit of work description for the second unit of work and/or in the content of the comments. In some implementations, the second work unit record may automatically include a due date value. The due date value may be an amount of time prespecified by the administrative user and/or other users added to the due date and/or completion date of the first unit of work, and/or a current date. In some implementations, the second work unit record may not automatically include a due date value (i.e., the due date value requires user input).

In some implementations, responsive to obtaining the second user input characterizing the selection of the second user interface element on the first work unit page of the first unit of work, user interface component 110 may be configured to effectuation presentation of a set of recommended revision instructions on the first work unit page. By way of non-limiting example, the recommended revisions instructions included in the set may include one or more of an instruction to revise a title, an instruction to revise content of a digital content item, an instruction to revise a deadline or timeframe for the first unit of work, an instruction to revise users on a team related to the first unit of work, and/or other instructions. The set of recommended revision instructions presented may be modified and/or created by an administrative user and/or other users to adapt to use of the collaborative environment.

Work unit component 112 may be configured to obtain further user input including selection of one or more recommended revision instructions from the set of recommended revision instructions. The revisions to be completed as described in the second unit of work may include the one or more recommended revision instructions.

The second unit of work may be assigned to an assignor of the first unit of work. In some implementations, work unit component 112 may be configured to automatically assign individual ones of the individual units of work included in the one or more work unit records generated based on the user input information to individual users of a particular role. In some implementations, assignment may be dictated (e.g., changed from the automatic assignment, initially specified, etc.) by an assignee to other users as needed. By way of non-limiting illustration, the first user may assign the second unit of work to one or more other users as desired.

In some implementations, updating a work unit record to specify the revise value for the approval state parameter for a unit of work may cause the unit of work to be reassigned back to the assignor of the unit of work (alternatively and/or in addition to a new unit of work being generated and assigned to the original assignor). The revise value may be displayed within the work unit page for the unit of work by specifying, among other things, "changes requested." The assignee may provide specific instructions in a comment section. The assignor may be notified that the unit of work was not approved, but instead that changes were requested. The assignor may then make the changes. Upon completion, the assignor may specify a value of the approval state as "pending approval" and/or other values. The value of pending approval may refer to a request for approval following a request for revisions/changes. The work unit record may be updated to specify the pending approval value for the approval state parameter. Specifying the pending approval value may cause the unit of work to be again reassigned back to the original assignee for "final" approval. The assignee may then select a value of the approval state (e.g., again requesting changes, marking as approval, rejecting, and/or other states).

In some implementations, the work unit component 112 may be configured to update the first work unit record by specifying the reject value for the approval state parameter of the first unit of work. Such update may be responsive to obtaining third user input characterizing the selection of the third user interface element on the first work unit page of the first unit of work. In some implementations, updating the first work unit record to specify the reject value for the approval state parameter may cause a value of the status parameter of a preexisting second work unit record of a (preexisting) second unit of work to be specified with a value of incomplete. The first work unit record may be subordinate to the preexisting second work unit record within the record hierarchy. The value of the status parameter of the preexisting second work unit record may have been previously specified with a value of complete. In some implementations, the preexisting second work unit record may automatically include an updated due date value. The updated due date value may be an amount of time prespecified by the administrative user and/or other users added to the due date and/or completion date of the first unit of work, and/or a current date. In some implementations, the preexisting second work unit record may not automatically include an updated due date value, rather the due date value requires user input or remains the same (i.e., the past due date).

In some implementations, user interface component 110 may be configured to update the first work unit page to include indicia showing the first unit of work has been rejected. Such update may be responsive to the first work unit record specifying the reject value for the approval state parameter of the first unit of work. For example, the indicia showing that the first unit of work has been rejected may include the third user interface element that corresponds to the reject value to be a solid red box instead of the red-outlined box. For example, the indicia showing that the first unit of work has been rejected may include a red "X" icon and text specifying the user who rejected the unit of work.

In some implementations, the user input information may convey user input characterizing the deselection of the individual user interface elements in the individual work unit pages. The deselection of an individual user interface element in an individual work unit page of an individual unit of work may cause the corresponding value of the approval state parameter to be unspecified for the individual unit of work and/or set to a default value (e.g., null value). For example, the first user may select the first user interface element and the approval state parameter of the first unit of work may specify the approve value and the first work unit page may include, for example, a green check icon. Subsequently, the first user may deselect the first user interface element and the value for the approval state parameter of the first unit of work may be unspecified. Accordingly, the first work unit page may no longer include the green check icon.

In some implementations, environment state information may be updated as users continue to interact with the collaboration environment over time. The environment state component 108 may store and/or archive the environment state information periodically and/or based on user request to archive. In some implementations, the environment state component 108 may store historical environment state information specifying historical user information, historical work information, and/or other information.

Figure 3:
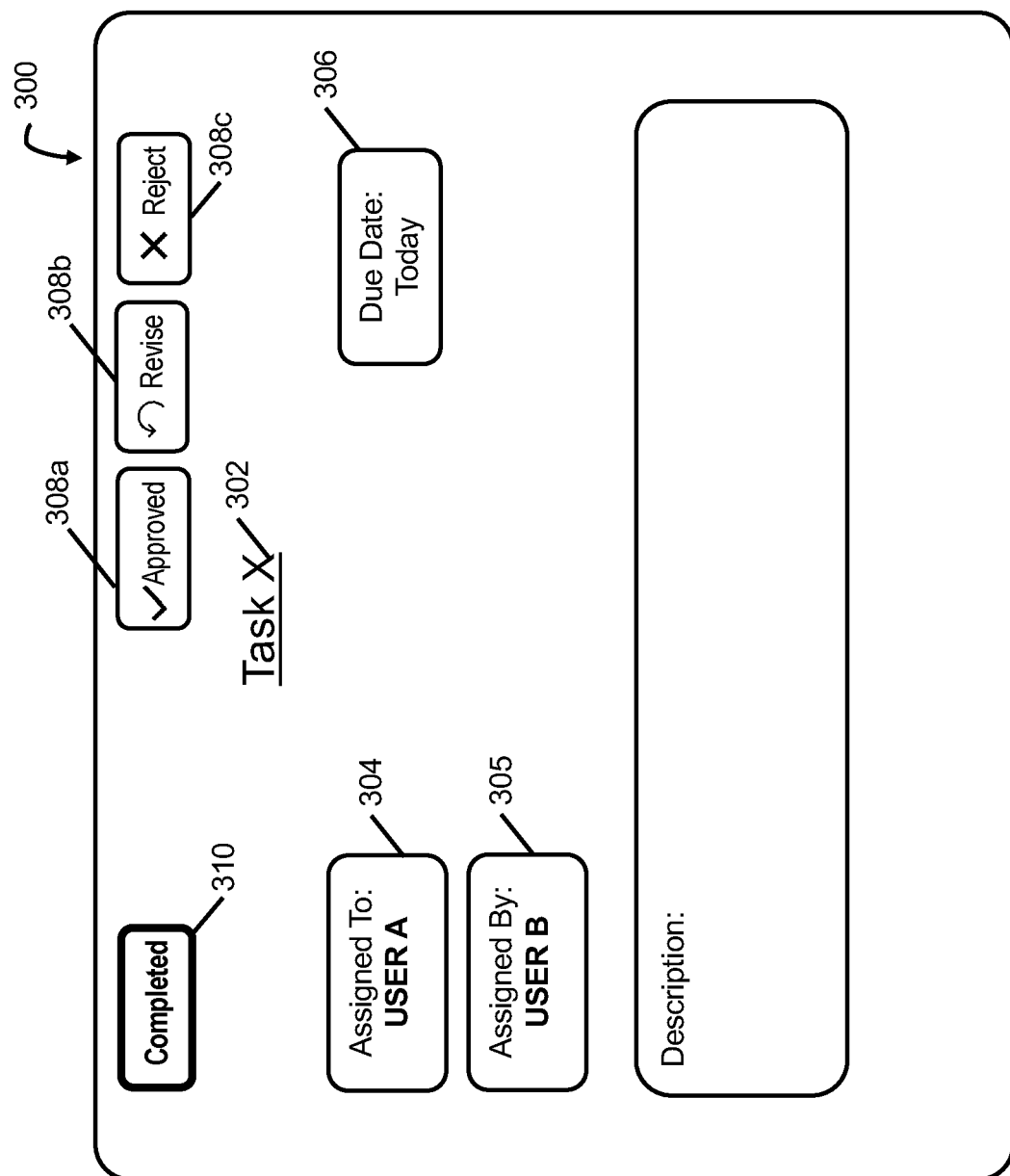
FIG. 3 illustrates a user interface, in accordance with one or more implementations.

FIG. 3 illustrates a user interface 300, in accordance with one or more implementations. The user interface 300 may display a first unit of work. The user interface 300 may display different values of one or more work unit parameters of the first unit of work, and/or other information. By way of non-limiting illustration, a user interface element 302 may display a title of the first unit of work (e.g., Task X). A user interface element 304 may display an assignee of the first unit of work (e.g., User A). A user interface element 305 may display an assignor of the first unit of work (e.g., User B). A user interface element 306 may display a due date of the first unit of work. User interface elements 308a-308c may display approval states a user may select for the first unit of work. User interface element 308a may represent approval of the first unit of work. User interface element 308b may represent revise the first unit of work. User interface element 308c may represent rejection of the first unit of work. Upon the assignee, User A, selecting user interface element 308a, a user interface element 310 that shows the first unit of work has been completed may be displayed.

Figure 4:
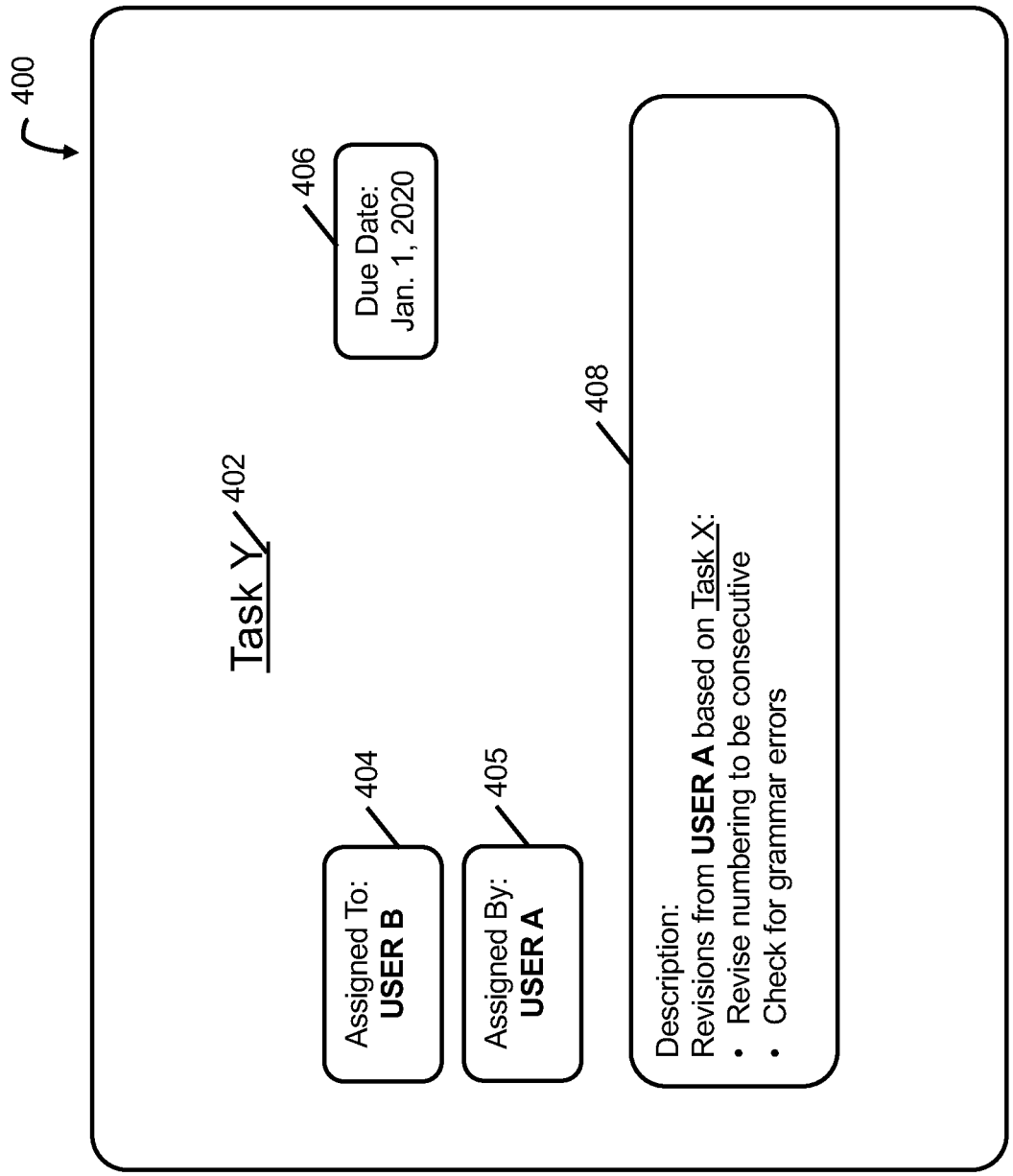
FIG. 4 illustrates a user interface, in accordance with one or more implementations.

FIG. 4 illustrates user interface 400, in accordance with one or more implementations. The user interface 400 may display a second unit of work. The user interface 400 may display different values of one or more work unit parameters of the second unit of work, and/or other information. Simultaneously referring to FIG. 3, responsive to user selection of user interface element 308b to request revisions of the first unit of work (e.g., Task X), a second work unit record for the second unit of work may be generated and user interface 400 may be displayed as illustrated in user interface 400 of FIG. 4. By way of non-limiting illustration, user interface 400 may display a user interface element 402 that may display a title of the second unit of work (e.g., Task Y). A user interface element 406 may display a due date of the second unit of work. A user interface element 404 may display an assignee of the second unit of work. The second unit of work may be assigned to the assignor (i.e., User B) of the first unit of work, as displayed by user interface element 305 in FIG. 3 responsive to the selection of user interface element 308b. A user interface element 405 may display an assignor of the second unit of work (e.g., User A). The second unit of work may be assigned by the assignee of the first unit of work, as displayed by user interface element 304 in FIG. 3, responsive to the selection of user interface element 308b (i.e., responsive to User A requesting revisions). A user interface element 408 may display a description for the second unit of work. Revisions input by User A prior to or subsequent to selection of user interface element 308b may be displayed in user interface element 408.

Figure 5:
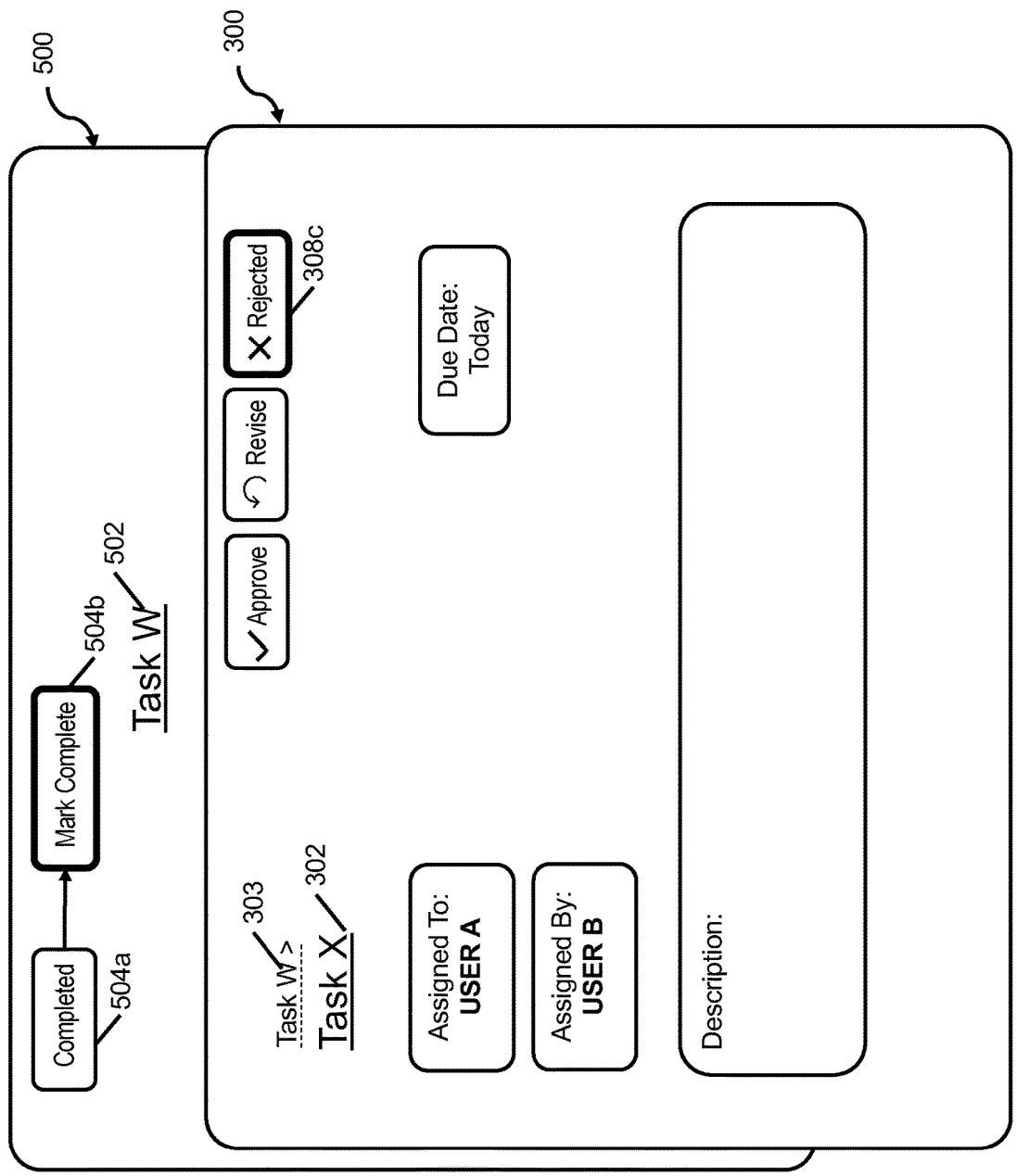
FIG. 5 illustrates user interfaces, in accordance with one or more implementations.

FIG. 5 illustrates a user interface 500 and user interface 300, in accordance with one or more implementations. User interface 300 may be the same as or similar to user interface 300 in FIG. 3. User interface 300 may display the first unit of work. User interface 500 may display a preexisting third unit of work. The third unit of work may display different values of one or more work unit parameters of the third unit of work, and/or other information. By way of non-limiting illustration, user interface 500 may display a user interface element 502 that may display a title of the third unit of work (e.g., Task W). User interface element 504a and 504b may display a status (e.g., "Mark Complete", "Complete") of the third unit of work. Similar to FIG. 3, the first unit of work may display different values of one or more work unit parameters of the first unit of work, and/or other information. By way of non-limiting illustration, a user interface element 302 may display the title of the first unit of work (e.g., Task X). A user interface element 303 may display the title of the third unit of work (i.e., Task W) of which the first unit of work is subordinate to. Responsive to user selection of user interface element 308c to reject the first unit of work Task X, user interface element 504a of the third unit of work, "Completed", may be updated to display user interface element 504b of the third unit of work, "Mark Complete". In other words, a status of the third work unit record may be specified as incomplete and user interface 500 may display accordingly.

It is noted that FIGS. 3-5 are for illustrative purposes only and are not to be considered limiting. Instead, it is to be understood that user interfaces may be configured in other ways and/or including other elements in accordance with one or more implementations of the system 100 presented herein.

Referring back to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform may include one or more processors configured to execute computer program components. The computer program components may be configured to enable an expert or user associated with the given client computing platform to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, and/or 112, and/or other components. Processor(s) 130 may be configured to execute components 108, 110, and/or 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 2:
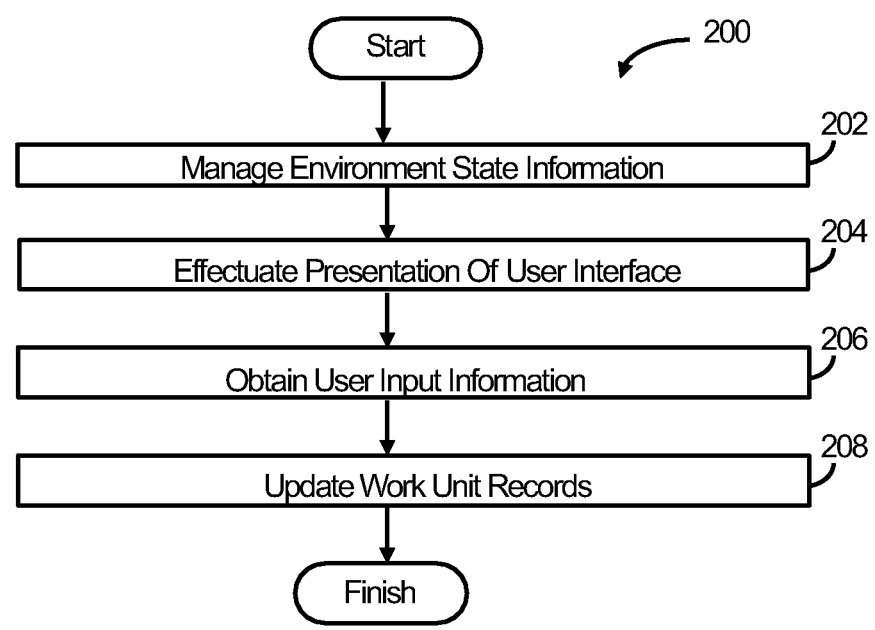
FIG. 2 illustrates a method to facilitate user engagement with units of work assigned within a collaboration environment, in accordance with one or more implementations.

FIG. 2 illustrates a method 200 to facilitate user engagement with units of work assigned within a collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment. The collaboration environment may be configured to facilitate interaction by users with the collaboration environment. The environment state information may include work unit records describing units of work assigned to individual users within the collaboration environment. The work unit records may include values of an approval state parameter. The values of the approval state parameter including an approve value, a revise value, and a reject value, the work unit records including a first work unit record for a first unit of work. Operation 202 may be performed by one or more hardware processors configured by machine-readable instructions including a component that is the same as or similar to environment state component 108, in accordance with one or more implementations.

An operation 204 may effectuate presentation of a user interface (of the collaboration environment) displaying individual work unit pages that may include a set of user interface elements available for selection by the users. Individual user interface elements in the set may correspond to different ones of the values of the approval state parameter. Operation 204 may be performed by one or more hardware processors configured by machine-readable instructions including a component that is the same as or similar to user interface component 110, in accordance with one or more implementations.

An operation 206 may obtain user input information conveying user input characterizing the selection of the individual user interface elements in the individual work unit pages. Operation 206 may be performed by one or more hardware processors configured by machine-readable instructions including a component that is the same as or similar to work unit component 112, in accordance with one or more implementations.

An operation 208 may update the work unit records based on the user input information. Operation 208 may be performed by one or more hardware processors configured by machine-readable instructions including a component that is the same as or similar to work unit component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate user engagement with work unit records of a collaboration environment, the system comprising:
   one or more physical processors configured by machine-readable instructions to:
   manage, at a server, electronically stored environment state information maintaining a collaboration environment, the collaboration environment being configured to facilitate interaction by users with the collaboration environment, a first user interacting with the collaboration environment via a first remotely located client computing platform communicating with the server over an Internet connection, the environment state information including a first work unit record for a first unit of work involving review of a first digital content item, the first work unit record including a value of an approval state parameter, the approval state parameter characterizing approval of the first unit of work by the first user, values of the approval state parameter including an approve value, a revise value conveying a request to generate changes to the first digital content item, and a reject value;

establish the Internet connection between the first remotely located client computing platform and the server;

effectuate communication of information from the server to the first remotely located client computing platform so that the first remotely located client computing platform presents a user interface of the collaboration environment, the user interface displaying a first work unit page for the first unit of work, the first work unit page including a set of user interface elements available for selection, individual user interface elements in the set of user interface elements corresponding to different ones of the values of the approval state parameter;

obtain, at the server, user input information conveying user input into the first remotely located client computing platform characterizing the selection of the individual user interface elements in the first work unit page, the selection of an individual user interface element causing a corresponding value of the approval state parameter to be specified for the first work unit record; and update, at the server, the first work unit record based on the user input information, such that:

responsive to the user input information conveying a first selection of a first user interface element on the first work unit page, update the first work unit record by specifying the approve value as the value for the approval state parameter of the first work unit record;

responsive to the user input information conveying a second selection of a second user interface element on the first work unit page, update the first work unit record by specifying the revise value as the value for the approval state parameter of the first work unit record, the revise value conveying a first request to generate one or more changes to the first digital content item; and responsive to the user input information conveying a third selection of a third user interface element on the first work unit page, update the first work unit record by specifying the reject value as the value for the approval state parameter of the first work unit record.

2. The system of claim 1, wherein updating the first work unit record to specify the approve value as the value for the approval state parameter causes a status value of a status parameter of the first work unit record to be specified with the status value of complete.

3. The system of claim 1, wherein updating the first work unit record to specify the revise value as the value for the approval state parameter for the first work unit record causes:

a second work unit record for a second unit of work to be generated, the second unit of work being assigned to an assignor of the first unit of work, and describing the one or more changes.

4. The system of claim 3, wherein a description of the one or more changes are input by an assignee of the first unit of work.

5. The system of claim 3, wherein the one or more physical processors are further configured by the machine-readable instructions to:

responsive to obtaining the user input information conveying the second selection of the second user interface element, effectuate presentation of a set of recommended revision instructions on the first work unit page;

obtain further user input including selection of one or more recommended revision instructions from the set of recommended revision instructions; and wherein the one or more changes as described in the second work unit record include the one or more recommended revision instructions.

6. The system of claim 1, wherein updating the first work unit record to specify the reject value as the value for the approval state parameter causes:

a status value of a status parameter of a preexisting second work unit record for a second unit of work to be specified with the status value of incomplete, wherein the first work unit record is subordinate to the second work unit record within a record hierarchy, and wherein the status value of the status parameter of the second work unit record was previously specified with the status value of complete.

7. The system of claim 1, wherein the one or more physical processors are further configured by the machine-readable instructions to:

update the user interface based on the update of the first work unit record, such that:

responsive to the first work unit record specifying the approve value as the value for the approval state parameter of the first unit of work, update the first work unit page to include indicia showing that the first unit of work has been approved;

responsive to the first work unit record specifying the revise value as the value for the approval state parameter of the first unit of work, update the first work unit page to include indicia showing that the first unit of work requires revision; and responsive to the first work unit record specifying the reject value as the value for the approval state parameter of the first unit of work, update the first work unit page to include indicia showing the first unit of work has been rejected.

8. The system of claim 1, wherein the first work unit page includes an instance of the first digital content item.

9. The system of claim 8, wherein the first digital content item comprises one or more of an image, a video, an audio file, a PDF, or a word document.

10. The system of claim 1, wherein the first work unit record is subordinate to a second work unit record.

11. A method to facilitate user engagement with work unit records of a collaboration environment, the method comprising:

managing, at a server, electronically stored environment state information maintaining a collaboration environment, the collaboration environment being configured to facilitate interaction by users with the collaboration environment, a first user interacting with the collaboration environment via a first remotely located client computing platform communicating with the server over an Internet connection, the environment state information including a first work unit record for a first unit of work involving review of a first digital content item, the first work unit record including a value of an approval state parameter, the approval state parameter characterizing approval of the first unit of work by the first user, values of the approval state parameter including an approve value, a revise value conveying a request to generate changes to the first digital content item, and a reject value;

establishing the Internet connection between the first remotely located client computing platform and the server;

effectuating communication of information from the server to the first remotely located client computing platform so that the first remotely located client computing platform presents a user interface of the collaboration environment, the user interface displaying a first work unit page for the first unit of work, the first work unit page including a set of user interface elements available for selection, individual user interface elements in the set of user interface elements corresponding to different ones of the values of the approval state parameter;

obtaining, at the server, user input information conveying user input into the first remotely located client computing platform characterizing the selection of the individual user interface elements in the first work unit page, the selection of an individual user interface element causing a corresponding value of the approval state parameter to be specified for the first work unit record; and updating, at the server, the first work unit record based on the user input information, including:

responsive to the user input information conveying a first selection of a first user interface element on the first work unit page, updating the first work unit record by specifying the approve value as the value for the approval state parameter of the first work unit record;

responsive to the user input information conveying a second selection of a second user interface element on the first work unit page, updating the first work unit record by specifying the revise value as the value for the approval state parameter of the first work unit record, the revise value conveying a first request to generate one or more changes to the first digital content item; and responsive to the user input information conveying a third selection of a third user interface element on the first work unit page, updating the first work unit record by specifying the reject value as the value for the approval state parameter of the first work unit record.

12. The method of claim 11, wherein the updating the first work unit record to specify the approve value as the value for the approval state parameter causes a status value of a status parameter of the first work unit record to be specified with the status value of complete.

13. The method of claim 11, wherein the updating the first work unit record to specify the revise value as the value for the approval state parameter for the first work unit record causes the method to further perform:

generating a second work unit record for a second unit of work, the second unit of work being assigned to an assignor of the first unit of work, and describing the one or more changes.

14. The method of claim 13, wherein a description of the one or more changes are input by an assignee of the first unit of work.

15. The method of claim 13, further comprising:

responsive to obtaining the user input information conveying the second selection of the second user interface element, effectuating presentation of a set of recommended revision instructions on the first work unit page;

obtaining further user input including selection of one or more recommended revision instructions from the set of recommended revision instructions; and wherein the one or more changes as described in the second work unit record include the one or more recommended revision instructions.

16. The method of claim 11, wherein the updating the first work unit record to specify the reject value as the value for the approval state parameter causes the method to further perform:

specifying a status value of a status parameter of a preexisting second work unit record for a second unit of work with the status value of incomplete, wherein the first work unit record is subordinate to the second work unit record within a record hierarchy, and wherein the status value of the status parameter of the second work unit record was previously specified with the status value of complete.

17. The method of claim 11, further comprising:

updating the user interface based on the update of the first work unit record, such that:

responsive to the first work unit record specifying the approve value as the value for the approval state parameter of the first unit of work, updating the first work unit page to include indicia showing that the first unit of work has been approved;

responsive to the first work unit record specifying the revise value as the value for the approval state parameter of the first unit of work, updating the first work unit page to include indicia showing that the first unit of work requires revision; and responsive to the first work unit record specifying the reject value as the value for the approval state parameter of the first unit of work, updating the first work unit page to include indicia showing the first unit of work has been rejected.

18. The method of claim 11, wherein the first work unit page includes an instance of the first digital content item.

19. The method of claim 18, wherein the first digital content item comprises one or more of an image, a video, an audio file, a PDF, or a word document.

20. The method of claim 11, wherein the first work unit record is subordinate to a second work unit record.

* * * * *